(12) United States Patent
Harper (10) Patent No.: US 10,644,564 B1
(45) Date of Patent: May 5, 2020

(54) MAGNETIC MOTOR WITH DYNAMIC TIMING ADJUSTMENT

(71) Applicant: Mark Herman Harper, Long Beach, CA (US)

(72) Inventor: Mark Herman Harper, Long Beach, CA (US)

(*) Notice: Subject to any disclaimer, the term of this patent is extended or adjusted under 35 U.S.C. 154(b) by 329 days.

(21) Appl. No.: 15/700,046

(22) Filed: Sep. 8, 2017

Related U.S. Application Data (60) Provisional application No. 62/385,874, filed on Sep. 9, 2016.

(51) Int. Cl.
| | |
|---|---|
| H02K 7/065 | (2006.01) |
| H02K 21/02 | (2006.01) |
| H02K 23/04 | (2006.01) |
| H02K 33/02 | (2006.01) |
| H02K 35/02 | (2006.01) |
| H02K 41/02 | (2006.01) |
| H02K 33/16 | (2006.01) |

(52) U.S. Cl.
CPC ............ *H02K 7/065* (2013.01); *H02K 21/028* (2013.01); *H02K 33/02* (2013.01); *H02K 35/02* (2013.01); *H02K 23/04* (2013.01); *H02K 33/16* (2013.01); *H02K 41/02* (2013.01)

(58) Field of Classification Search
CPC .......... H02K 7/06; H02K 7/065; H02K 7/075; H02K 19/00; H02K 21/00; H02K 21/02; H02K 21/028; H02K 21/12; H02K 21/125; H02K 21/14; H02K 21/145; H02K 21/16; H02K 21/26; H02K 21/28; H02K 21/30; H02K 23/00; H02K 23/04; H02K 33/02; H02K 33/16; H02K 35/02; H02K 41/02

USPC .................... 310/10, 40 R, 46, 48
See application file for complete search history.

(56) References Cited

U.S. PATENT DOCUMENTS

| | | | |
|---|---|---|---|
| 4,371,798 A | 2/1983 | Kuroda | |
| 6,552,450 B2 | 4/2003 | Harty et al. | |
| 8,336,409 B2 | 12/2012 | Edwards | |
| 8,487,484 B1 | 7/2013 | Miller, Jr. | |
| 9,190,881 B1 * | 11/2015 | Jahani | H02K 7/06 |
| 9,343,947 B2 | 5/2016 | Simcox | |
| 2004/0183387 A1 * | 9/2004 | Moe | H02K 53/00 310/152 |

(Continued)

FOREIGN PATENT DOCUMENTS

NL    747727    4/1957

*Primary Examiner* — Emily P Pham
*Assistant Examiner* — David A. Singh
(74) *Attorney, Agent, or Firm* — Andrew S. Naglestad (57) ABSTRACT

A magnetic motor comprising a timing controller and at least one cylinder having a piston, an upper cylinder head, and a lower cylinder head is disclosed. The piston, upper cylinder head, and lower cylinder head each include a set of one or more magnets characterized by a common pattern. The one or more magnets in the piston, the upper cylinder head, and lower cylinder head comprise poles oriented parallel to the longitudinal axis of the cylinder. The piston oscillates linearly in the cylinder but does not rotate, while the upper and lower cylinder heads rotate in place but do not move linearly. The timing controller is configured to vary the phase between longitudinal oscillation of the piston and angular oscillation of the upper and lower cylinder heads to optimally drive the piston up and down in the cylinder.

19 Claims, 7 Drawing Sheets

(56) References Cited

U.S. PATENT DOCUMENTS

| | | | | |
|---|---|---|---|---|
| 2006/0131887 A1* | 6/2006 | Gosvener | ............... | F03G 7/08 |
| | | | | 290/1 R |
| 2006/0244316 A1* | 11/2006 | Kundel | ............... | H02K 49/10 |
| | | | | 310/15 |
| 2006/0273666 A1* | 12/2006 | Mihajlovic | ............ | H02K 53/00 |
| | | | | 310/15 |
| 2010/0308601 A1* | 12/2010 | Walden | ............... | H02K 53/00 |
| | | | | 290/1 R |

* cited by examiner

FIG. 10

MAGNETIC MOTOR WITH DYNAMIC TIMING ADJUSTMENT

CROSS-REFERENCE TO RELATED APPLICATION(S)

This application claims the benefit of U.S. Provisional Patent Application Ser. No. 61/385,874 filed Sep. 9, 2016, titled "Magnetic motor with dynamic timing adjustment," which is hereby incorporated by reference herein for all purposes.

TECHNICAL FIELD

The invention relates to a motor using magnets. In particular, the invention employs arrays of magnets to produce reciprocal motion and a dynamic timing adjustment mechanism to regulate or otherwise maintain the rate of oscillation.

BACKGROUND

The internal combustion engine has dominated the automotive industry and many other industries for over a century. These engines have been integrated into every form of machine conceivable. The world has become entirely reliant on this source of power and, as a result, consumed petroleum resources at an unsustainable rate. Electric motors and battery technology are improving, yet the range of these vehicles is still disappointing. There is therefore a need for a new technology that can provide clean power without the environmental impact of the combustion engine and range limitations of battery-powered electric motors.

SUMMARY

The present invention overcomes the limitations of the prior art with a novel magnetic engine. The invention in the preferred embodiment is a magnetic motor comprising: a timing controller and at least one cylinder having a piston and an upper cylinder head. The piston and the upper cylinder head both include a set of one or more magnets characterized by a common pattern. The one or more magnets in the piston and the upper cylinder head both comprise poles oriented parallel to the longitudinal axis of the cylinder. The piston oscillates linearly in the cylinder but does not rotate, while the upper cylinder head rotates in place but does not move linearly.

In at least one embodiment, the timing controller is configured to rotate the upper cylinder head in place relative to the piston. In particular, the upper cylinder head is configured to rotate between a pull state and a push state. In the pull state, the piston is attracted to the upper cylinder head. In the push state, the piston is repelled from the upper cylinder head. The timing controller rotates the upper cylinder head between the push and pull states in synchronicity with the oscillation of the piston in order to maintain the oscillation of the piston. In some situations, the timing controller varies the phase between longitudinal oscillation of the piston and the angular rotation of the upper cylinder head to optimally drive the piston up and down in the cylinder.

In some embodiments, the at least one cylinder further comprises a lower cylinder head with the same pattern of magnets as the piston and upper cylinder head. Like the upper cylinder head, the timing controller rotates the lower cylinder head in place relative to the piston between a pull state and a push state. The timing controller varies the phase between longitudinal oscillation of the piston and the angular rotation of the lower cylinder head to optimally drive the piston up and down in the cylinder.

In some embodiments, the pattern is characterized by an equal number of north-ended magnets and south-ended magnets radially disposed about a circumference of a circle. The north-ended magnets and south-ended magnets are sequentially arranged about the circumference of the circle in an alternating pattern. For a pattern with two magnets, the north-ended magnets and south-ended magnets are sequentially disposed about the circumference of the circle in a North-South pattern, each one occupying about 180 degrees of the pattern. For a pattern with four magnets, the north-ended magnets and south-ended magnets are sequentially disposed about the circumference of the circle in a North-South-North-South pattern, each one occupying about 90 degrees of the pattern. For a pattern with six magnets, the north-ended magnets and south-ended magnets are sequentially disposed about the circumference of the circle in a North-South-North-South-North-South pattern, each one occupying about 60 degrees of the pattern. In these patterns, the north-ended and south-ended magnets are arranged in a single ring. In other embodiments, the magnets may be arranged in two or more rings.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

The present invention relates to a powerful motor that fundamentally relies on rare earth permanent magnets to provide the driving forces. The magnetic forces are generated by the precise placement and movement of the strong rare-earth magnets. Properly implemented, the arrangement of the magnetic segments can propel a piston(s) to oscillate up and down in a cylinder, thereby turning a crankshaft that delivers power to a vehicle or any other mechanism commonly run by a conventional fuel powered motor. The motor in the present invention, referred to herein as an "magnetic motor" or "m-motor," requires no gasoline, diesel, or other fuel since it operates on the principles of magnetic forces rather than internal combustion. Being liberated from fossil fuels, the m-motor of the present invention can therefore provide a boundless source of clean energy without any of the environmental degradation issues attributable to fossil fuels.

Figure 1:
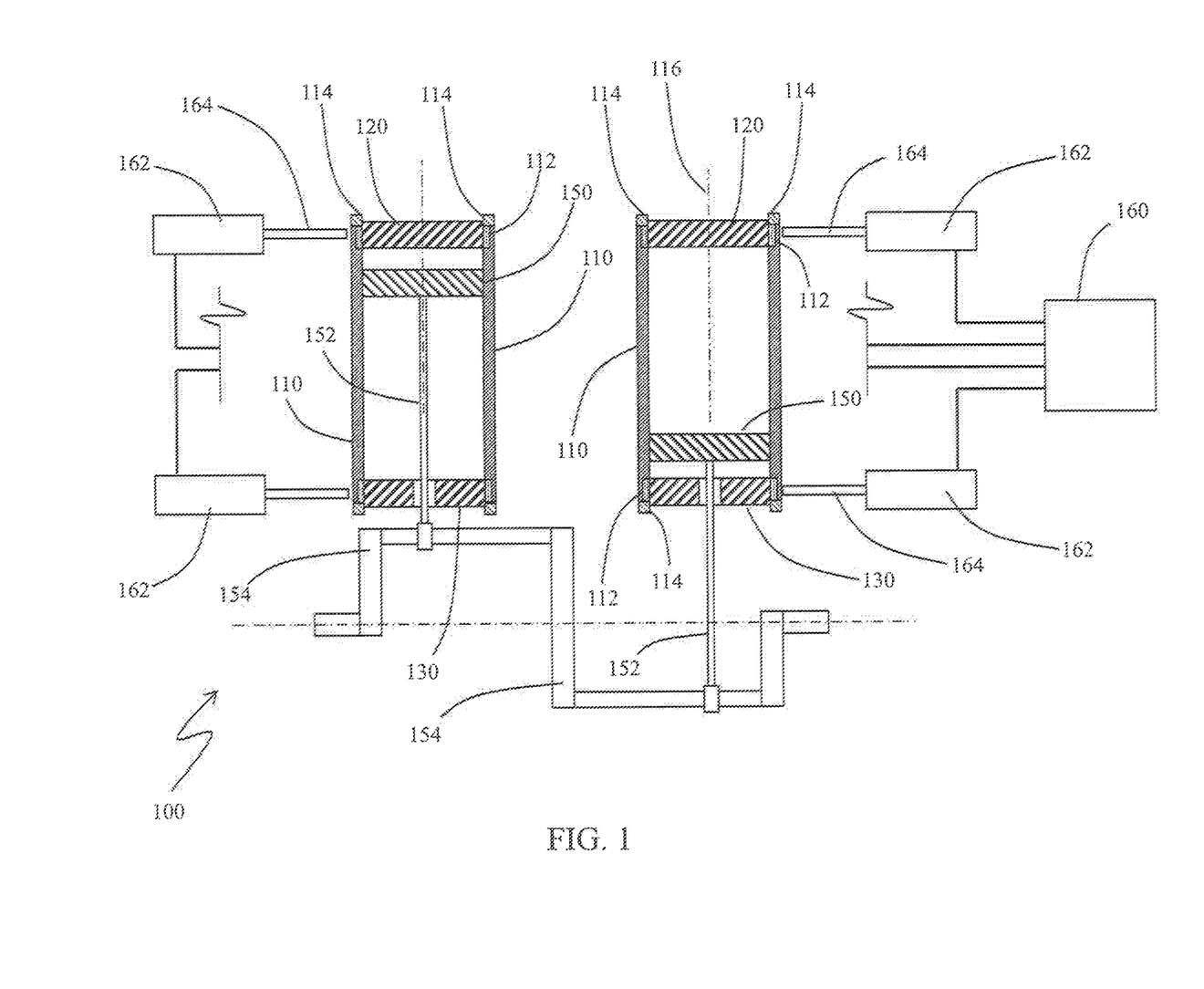
FIG. 1 is a diagrammatic illustration of a two-cylinder embodiment of the magnetic motor of the present invention.

Illustrated in FIG. 1 is a cross section of a two-cylinder embodiment of the m-motor 100. Each cylinder is defined by the cylindrical-shaped wall 110 made of a non-ferrous material, a first rotating cylinder head at the top end of the cylinder referred to herein as the "upper cylinder head" 120, a second rotating cylinder head at the bottom end of the cylinder referred to herein as a "lower cylinder head" 130, along with a piston 150 that reciprocates in the cylinder 110. The cylinder walls 110 are made of a rigid non-ferrous material and are fixed in place. The upper cylinder head 120 and lower cylinder head 130 are rotatable and are mounted to the ends of the cylinder wall by means of roller bearings 112 and retaining clips 114 or rings, for example. The bearing and retaining clip or ring hold the upper and lower cylinder head captive at the ends of the cylinder wall while still allowing the cylinder heads to rotate in place about the longitudinal axis 116 of the cylinder wall. In accordance with the present invention, the upper cylinder head, lower cylinder head, and piston each have a pattern of magnetic segments that effectively couple the piston to the upper and lower cylinder head magnetically. Based on the orientation of these magnetic segments, the cylinder heads induce either an attractive force or a repulsive force on the piston, thereby drawing the piston up and down in a linear oscillating manner.

The cylinder heads 120, 130 are comprised of groups of permanent magnetic segments in their respective order north-south placed side by side in the upper cylinder head as well as the lower cylinder head to either attract or repeal the piston. The lower cylinder 130 head has a hole 132 in the center of the magnetic segments making up the lower cylinder head, this is to allow the piston connecting rod 152 an open area to pass through and connect to the crankshaft 154. The attractive and repulsive forces are induced by the rotation of the upper and lower cylinder heads so that they either align with or oppose the magnetic orientation of the piston. In particular, the piston 150 is attracted to one of the two cylinder heads 120, 130 when the poles of the magnets of the piston align with opposite poles of the cylinder head (e.g., north align with south). Similarly, the piston is repealed by one of the cylinder heads when the poles of the magnets of the piston align with same poles of the cylinder head (e.g., north aligns with north and south aligns with south). Whether the piston is attracted to or repelled by a cylinder head is determined by the orientation of the cylinder heads in respect of the orientation of the magnetic segments in the piston which, in turn, is governed by a timing controller 160. The timing controller 160 sets the orientation of the upper and lower cylinder heads at each instant in time and causes the cylinder heads to rotate by means of solenoids 162 and sleigh gears or other linkages 164, for example.

The m-motor further includes piston rods 152 which are pivotally linked to pistons 150 and a crankshaft 154. As the pistons 150 reciprocate in the cylinders 110, the crankshaft is made to turn and the resulting output power transmitted to produce work, or to another mechanical system including an electric generator, for example.

Due to the magnetic properties of the piston in relation to the upper and lower cylinder heads, the m-motor is generally comprised of non-magnetic, non-ferrous materials including aluminum, austenitic stainless steels, ceramic or epoxy's from reverse engineering. That is, the cylinder walls 110, piston rods 152, and crankshaft 154 are completely or nearly completely non-magnetic. The upper and lower cylinder head 120, 130 as well as the pistons 150 are also non-magnetic with the exception of the rare-earth magnets embedded therein and the ball bearings that support the upper and lower cylinder heads.

FIGS. 2A-2H are the magnetism patterns of the piston and cylinder heads (collectively referred to herein as magnetic couplers) in accordance with several embodiments of the present invention. The upper and lower cylinder heads as well as the pistons are "magnetically" attracted or repelled due to the cylinder heads specific alignment for the purpose of moving the piston within the cylinder walls. For each cylinder, the same pattern of magnetization is used for the piston as well as both the upper and lower cylinder head. That is to say, the pistons and upper and lower cylinder heads of a complete cylinder and cylinder head unit employ identical magnetic patterns, i.e., couplers whatever the pattern may be.

Figure 2A:
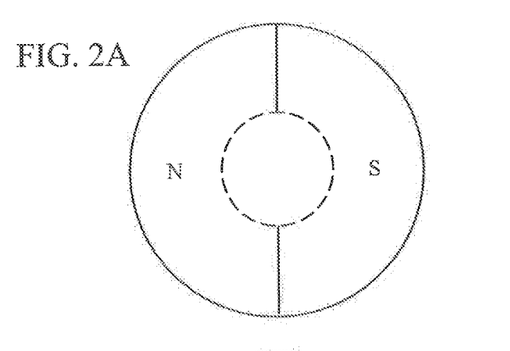
FIGS. 2A-2H are the magnetism patterns of the magnetic piston and cylinder heads in accordance with several embodiments of the present invention.
Figure 2B:
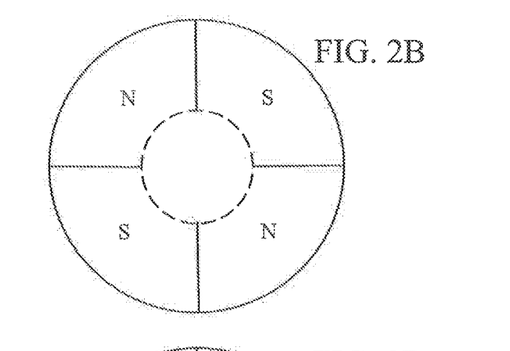
Figure 2C:
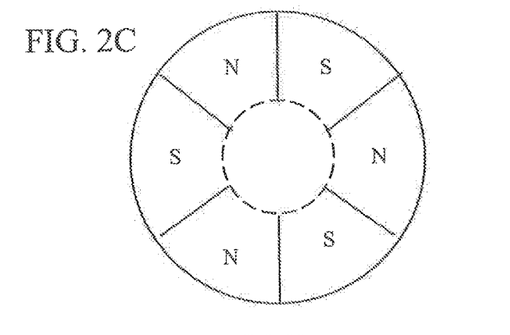
Figure 2D:
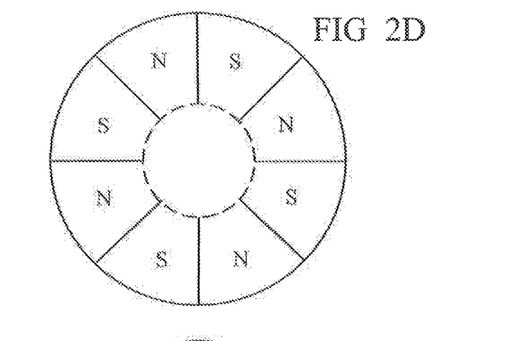

Each cylinder head, which is shown in cross sectional view perpendicular to the longitudinal axis 116 of the cylinder 110, represents a possible pattern of magnetization on the cylinder heads 120, 130 and pistons 150. Each magnetic cylinder head and matching piston has an even number of permanent magnets, and each magnet is axially magnetized with its north-south pole aligned in the vertical direction parallel to the longitudinal axis of the cylinder (perpendicular to drawing). The segments of north and south poles alternate uniformly around the circumference of the cylinder heads. In FIG. 2A, the magnets represented by the north and south poles each occupy 180 degree sections or arc lengths of the cylinder heads. In FIG. 2B, the magnets represented by the north and south poles each occupy 90 degree sections or arc lengths of the cylinder heads. In FIG. 2C, the magnets represented by the north and south poles each occupy 60 degree sections or arc lengths of the cylinder heads. In FIG. 2D, the magnets represented by the north and south poles each occupy 45 degree sections or arc lengths of the cylinder heads.

Figure 2E:
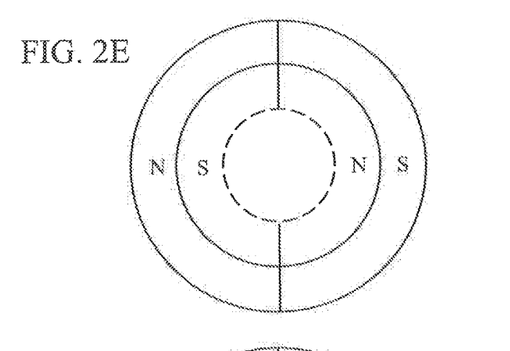
Figure 2F:
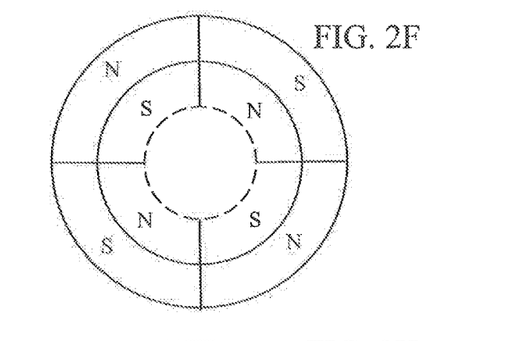
Figure 2G:
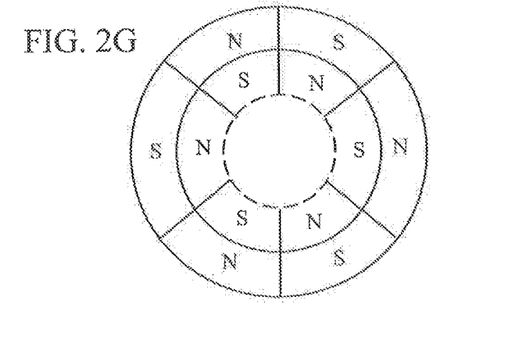
Figure 2H:
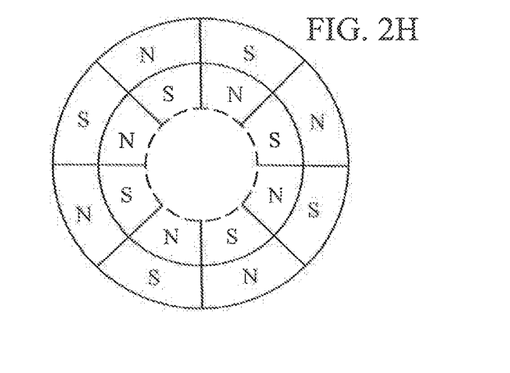

In FIGS. 2A-2D, the magnetic field is uniform in the radial direction across the cylinder heads from the center outward. In other embodiments, the field can vary radially as well. In FIG. 2E, the field varies from north to south, or from south to north in the radial direction. The same is true of the cylinder heads illustrated in FIGS. 2F-2H. Although not shown, the radial field may vary from north to south to north, or south to north to south in other embodiments. That is, the field may vary 3 or more times in the radial direction without departing from the scope of the present invention.

In some other embodiments, the pattern of magnetization on the cylinder heads and/or piston is also dynamically programmable upon a single magnet, that is to say that, the segmented pattern of north and south poles on the piston or cylinder head can be applied to a single round magnet to produce the same effect as the segmented magnets which produce the attractive and repulsive forces that drive the piston while it is reciprocating.

Whichever array of magnets is selected whether it is a single programmable smart magnet or otherwise, the same pattern of magnetization is used for both the upper and lower cylinder head and piston so that magnetic fields properly align, as described in more detail below. In the preferred embodiment, the magnets are strong permanent magnets such as Neodymium, samarium cobalt, alnico, or high energy ceramic magnets, or any combination of these magnets which are made of an alloy of any of the above listed magnetic materials.

Figure 3:
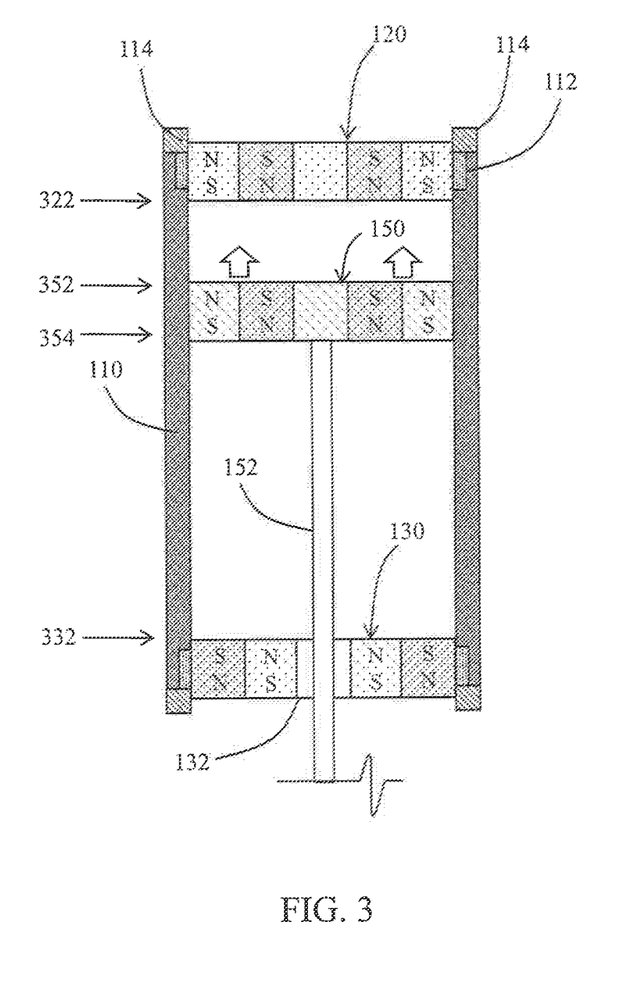
FIG. 3 is a cross sectional view of a cylinder of the magnetic-motor with the piston ascending, in accordance with the preferred embodiment of the present invention.

FIG. 3 is a cross sectional view of a cylinder of the m-motor with the piston ascending. The piston is made to ascend by inducing an attractive force from the cylinder head above the piston and a repulsive force from the cylinder head below the piston. In particular, the underside 322 of the upper cylinder head 130 has a radial pattern of magnetization or a single programmable smart magnet facing the piston that goes south-north-north-south (read from left to right) which is consistent with the cylinder head shown in FIG. 2H. The upper side 352 of the piston has an opposing pattern of fields which goes north-south-south-north (read from left to right). As a result, the piston is attracted to the underside of the upper cylinder head.

In addition to the attractive force induced by the upper cylinder head, the lower cylinder head produces a repulsive force that drives the piston upward as well. This repulsive force is achieved by matching the magnetization pattern on the underside 354 of the piston (south-north-north-south) with the magnetization pattern on the upper side 332 of the lower cylinder head (south-north-north-south when read from left to right).

Figure 4:
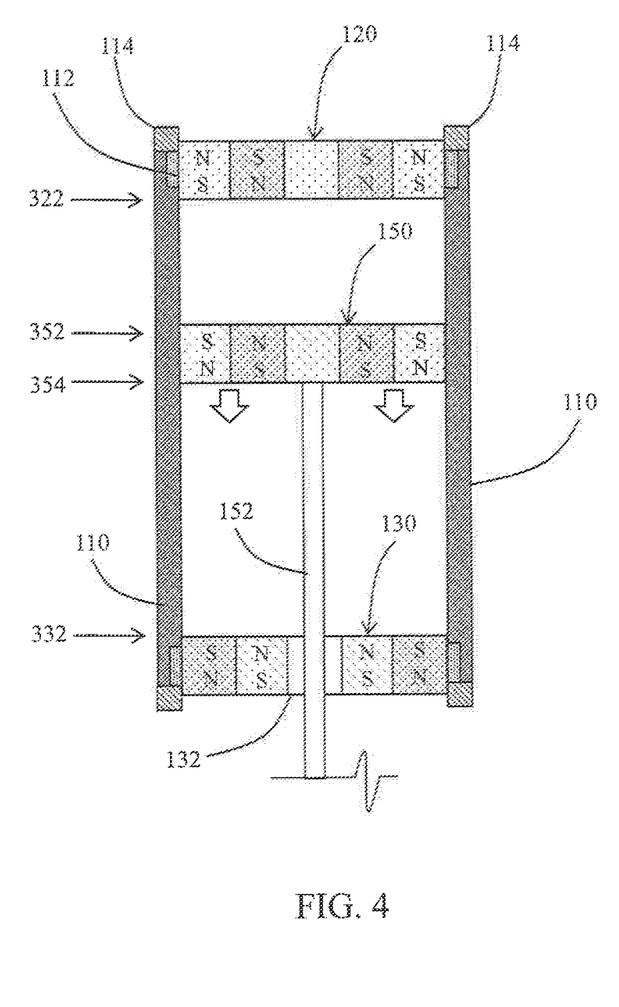
FIG. 4 is a cross sectional view of a cylinder of the magnetic-motor with the piston descending, in accordance with the preferred embodiment of the present invention.

FIG. 4 is a cross sectional view of a cylinder of the m-motor with the piston descending. The piston 150 is made to descend by rotating the upper and lower cylinder head to induce a repulsive force from above the piston and an attractive force from below the piston. In particular, the underside 322 of the upper cylinder head 120 has a radial pattern of magnetization that goes north-south-south-north. The upper side 352 of the piston has the same north-south-south-north pattern of fields which, as a result, the piston is repealed away from the upper cylinder head.

At the same time, the lower cylinder head produces an attractive force that drives the piston downward as well. This repulsive force is achieved by presenting a magnetization pattern on the underside 354 of the piston that is opposite that on the upper side 332 of the lower cylinder head 130. That is, the magnetization on the bottom of the piston is south-north-north-south while the upper side of the lower cylinder head has magnetization that goes north-south-south-north when read from left to right.

Figures 5, 6:
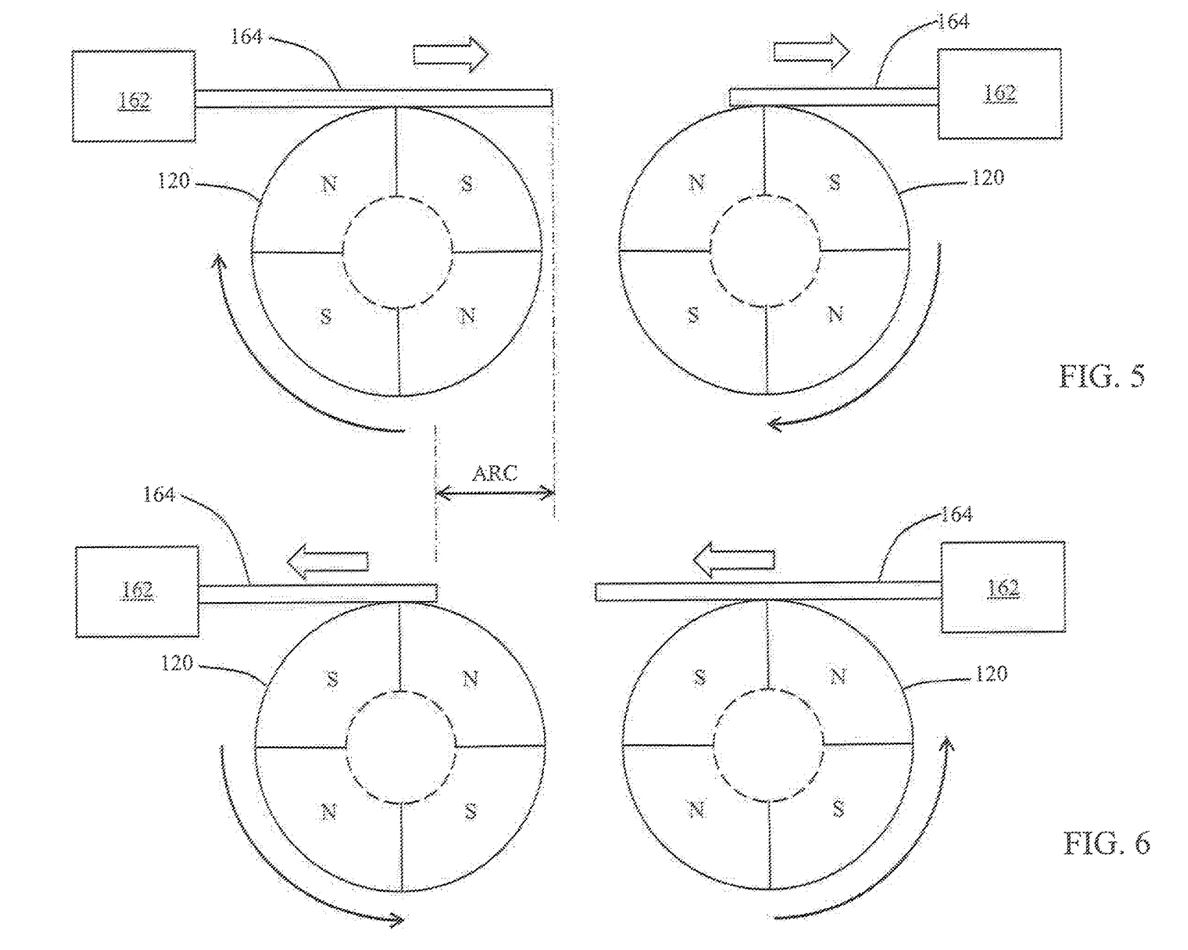
FIG. 5 is a cross sectional view of the top of the magnetic-motor, in accordance with the preferred embodiment of the present invention.
FIG. 6 is a cross sectional view of the top of the magnetic-motor, in accordance with the preferred embodiment of the present invention.

While FIGS. 3 and 4 show how the piston is draw up or down during a cycle, the cross sectional view of the top of the m-motor in FIGS. 5 and 6 show how the magnetization field is reversed between cycles. As stated above, the upper cylinder heads (and lower cylinder heads) are configured to rotate in place by means of solenoids and or linkage, for example. Actuation of the solenoid drives the linkage to the right or left which, in turn, rotates the upper cylinder heads clockwise or counter-clockwise, respectively. In the preferred embodiment, the upper cylinder heads are rotated at an angle given by the arc length of a section of magnet. In the upper cylinder head shown in FIGS. 5 and 6, the arc length is 90 degrees and therefore the rotation angle to alternate between attractive and repulsive field orientations is also 90 degrees. Similarly, the lower cylinder heads are also rotated 90 degrees to alternate between attractive and repulsive field orientations.

In the embodiment shown in FIGS. 5 and 6, the solenoids 162 drive linkages/sleigh gears 164 linearly from left to right and then right to left. In some other embodiments, the actuator is a circular gear driven by a stepper motor, for example, which drives the upper cylinder head (or lower cylinder head) in the same direction in 90 degree increments.

Figure 7A:
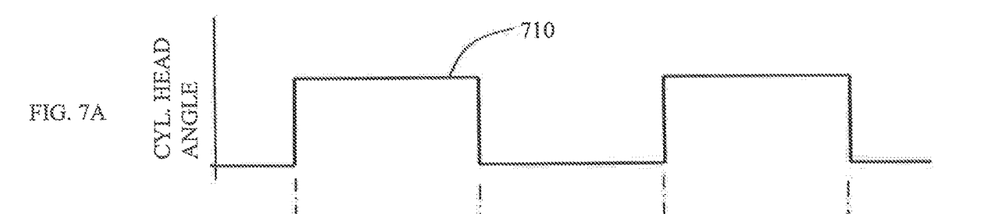
FIGS. 7A and 7B are graphs illustrating the angular orientation of the upper cylinder head relative to the position of the piston, in accordance with the preferred embodiment of the present invention.
Figure 8A:
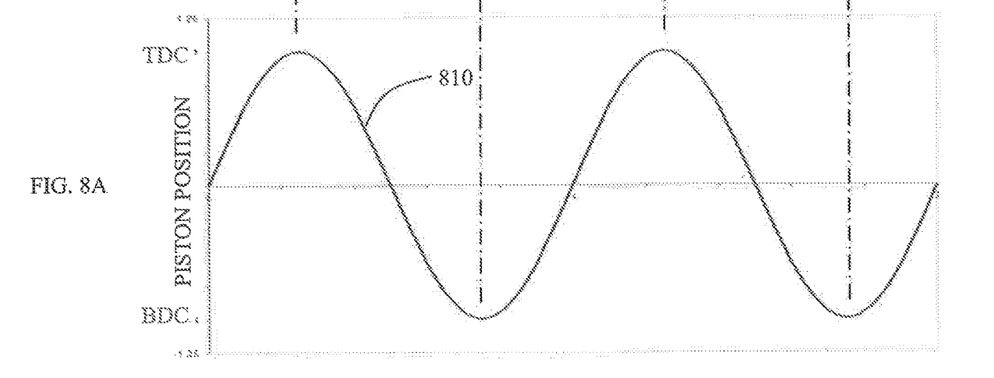
FIGS. 8A and 8B are graphs illustrating the position of the piston relative to the angular orientation of the upper cylinder head, in accordance with the preferred embodiment of the present invention.

In the embodiment described above, the upper cylinder heads and lower cylinder heads are perfectly aligned with the phase of the piston oscillation. In this case, the cylinder heads are made to rotate the appropriate amount given by arc length of section of magnet, as soon as the piston reaches top-dead-center as well as bottom-dead-center. As such, there is zero timing differential between the cylinder head rotation and the piston position. This case is shown in FIG. 8A, where the black line 810 with the sinusoidal shape represents the piston position as it reciprocates in the cylinder, and in FIG. 7A where the black line 710 with square tooth represents the angular orientation of the cylinder head. The square tooth indicates that the upper cylinder head turns each time the piston hits an extrema position, either top-dead-center (TDC) or bottom-dead-center (BDC) or there about varying by a few degrees as needed to attain maximum RPM and power.

Figure 7B:
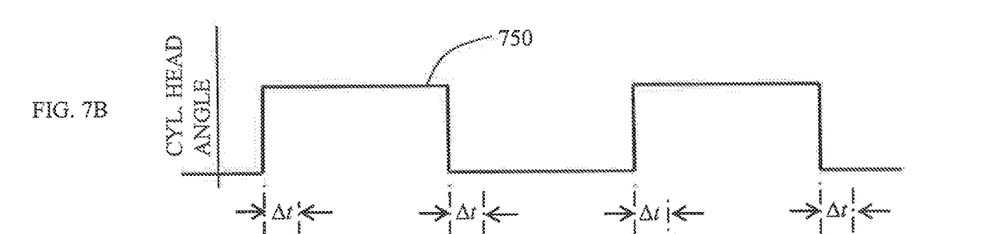
Figure 8B:
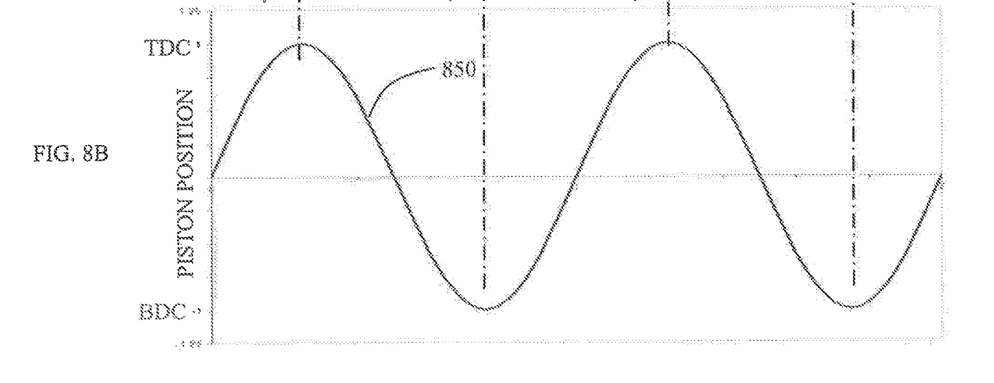

In other embodiments of the invention, the timing controller enables the cylinder head orientation to vary dynamically from the piston position. That is, the cylinder heads may be made to rotate the appropriate angle by an arbitrary number of degrees before or after the piston reaches top-dead-center and bottom-dead-center. For example, the upper and lower cylinder head may be caused to rotate the appropriate arc length, e.g., 90 degrees, a few milliseconds before the piston reaches top-dead-center, thus enabling the m-motor to account for the time necessary to rotate the cylinder head and achieve maximum repulsive force when the piston actually reaches top-dead-center. This scenario is illustrated in FIGS. 7B and 8B where the angular rotation of the cylinder head (750 in FIG. 7B) precedes the piston position 850 reaching TDC or BDC by a determine number of degrees. As shown, the upper cylinder head rotates at a point in time, $\Delta t$, before or after the piston reaches TDC or BDC.

In accordance with the present invention, the timing differential, $\Delta t$, may be dynamically altered during operation of the m-motor to account for the motor RPMs and load on the motor, for example.

Figure 9:
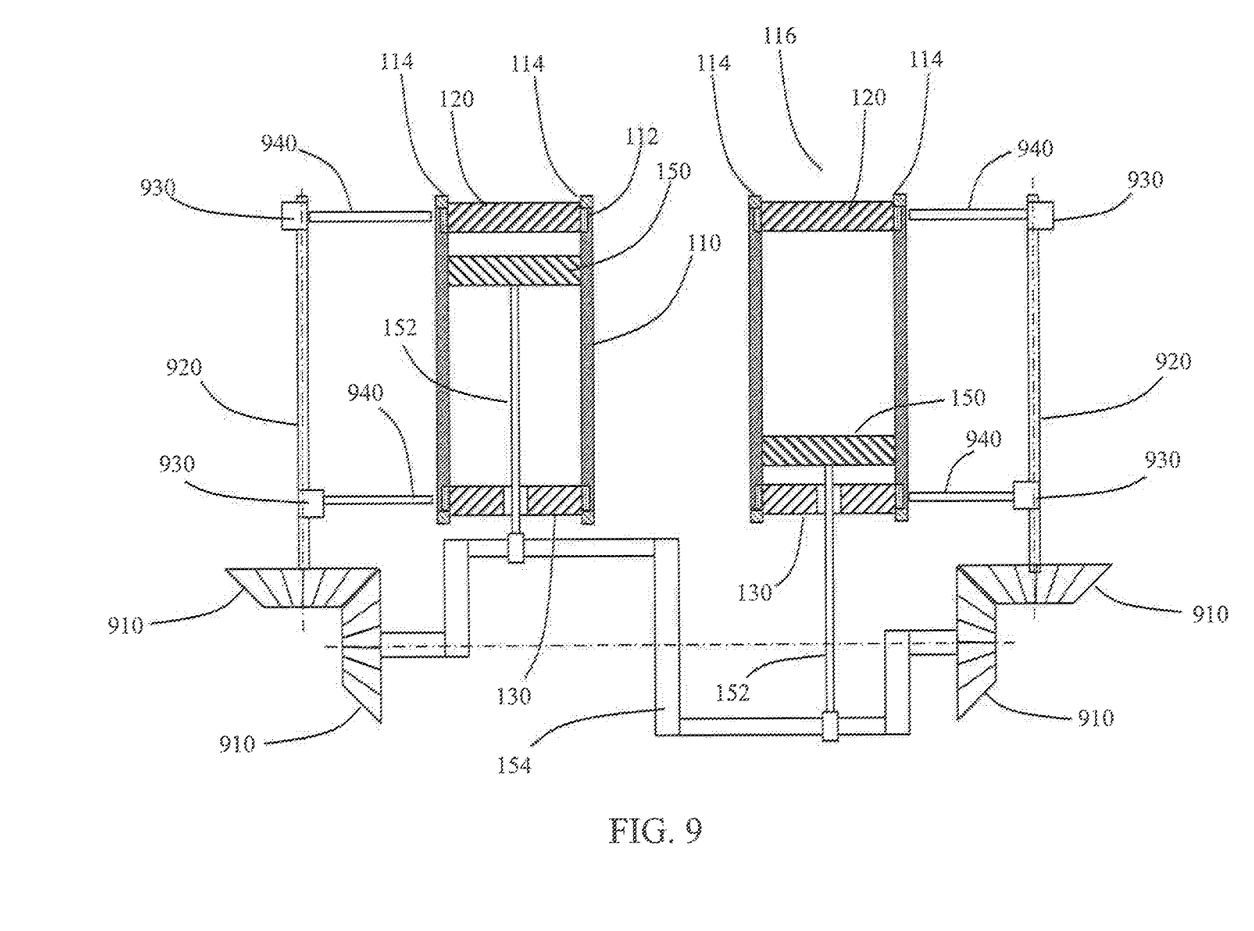
FIG. 9 is a diagrammatic illustration of a second embodiment of a two-cylinder magnetic-motor of the present invention.

Illustrated in FIG. 9 is a second embodiment of a two-cylinder version of the m-motor. This m-motor in this embodiment includes cylinder walls 110, pistons 150, upper cylinder heads 120, and lower cylinder heads 130, and crankshaft 154 the same as that shown in FIG. 1. In this embodiment, however, the rotation of the upper cylinder heads and lower cylinder heads is driven by a gear 910 and camshaft 920 with lobes 930 that cause gears and linkages 940 that engage the cylinder heads 120, 130 to translate. As such, the cylinder heads are made to rotate without the use of solenoids. The phase of the cylinder heads relative to the piston position may be altered using linear actuators that change the length of the linkage between the cams and the gearing where it contacts the cylinder heads. Thus, the timing of the head rotation may again be controlled dynamically to account for m-motor RPM and loading.

Figure 10:
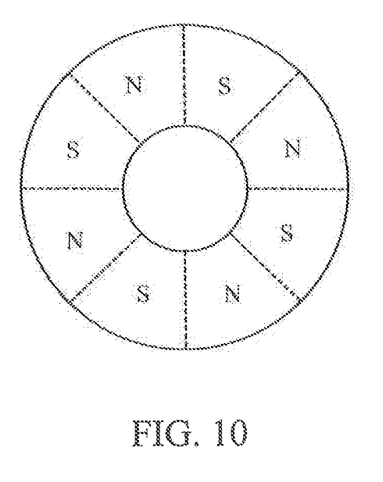
FIG. 10 is diagrammatic illustration of programmable magnetism patterns of a magnetic piston and cylinder heads in accordance with one embodiment of the present invention.

Illustrated in FIG. 10 is a single programmable smart magnetic that has been programmed to produce a pattern of magnetization comparable to that shown in FIG. 2D. The broken lines show the separation of the poles on the single magnet body. In particular, the segmented lines indicate the non-physical boundaries between the programmable sections of north and south poles on the piston or cylinder head. These north and south poles generated in the magnet body produce the same effect as the magnetic segments shown in FIG. 2D, for example. It is these magnetic segments that produce the attractive and repulsive forces that drive the piston while it is reciprocating. This type of programmable magnetic pattern may be employed to create any of the magnet patterns shown in FIGS. 2A-2H, and dynamically changed that magnetization. Moreover, the particular pattern of magnetization may be varied between strokes of the piston as needed. These programmable magnets, also referred to as "polymagnets" are available from Correlated Magnetics Research LLC located in New Hope, Ala.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A magnetic motor comprises:
   at least one timing controller, and
   at least one cylinder, defined by a longitudinal axis;
      wherein the at least one cylinder comprises:
         a. a piston comprising a first set of one or more magnets characterized by a first pattern, wherein the first set of one or more magnets comprise poles oriented parallel to said longitudinal axis; and
         b. an upper cylinder head with a second set of one or more magnets characterized by a second pattern, wherein the second set of one or more magnets comprise poles oriented parallel to said longitudinal axis; wherein the first pattern and the second pattern of one or more magnets are substantially identical;
      wherein the piston is configured to oscillate linearly in the cylinder and not rotate;
      wherein the upper cylinder head is configured to rotate in place and not move linearly;
      wherein an angular orientation of the upper cylinder head is characterized by a square tooth function, wherein the upper cylinder head rotates from a pull state to a push state at top dead center or near top dead center of the piston oscillation with respect to the upper cylinder head in accordance with the square tooth function.

2. The magnetic motor of claim 1, wherein the at least one timing controller comprises a first timing controller configured to rotate the upper cylinder head in place relative to the piston.

3. The magnetic motor of claim 2, wherein the piston is attracted to the upper cylinder head in the pull state, and wherein the piston is repelled from the upper cylinder head in the push state.

4. The magnetic motor of claim 3, wherein the first timing controller is configured to vary a phase between a longitudinal oscillation of the piston and an angular rotation of the upper cylinder head.

5. The magnetic motor of claim 4, wherein the at least one cylinder further comprises a lower cylinder head with a third set of one or more magnets characterized by a third pattern, wherein the third set of one or more magnets comprise poles oriented parallel to said longitudinal axis; wherein the first pattern and the second pattern and the third pattern of one or more magnets are substantially identical.

6. The magnetic motor of claim 5, wherein the at least one timing controller comprises a third timing controller configured to rotate the lower cylinder head in place relative to the piston.

7. The magnetic motor of claim 6, wherein the lower cylinder head is configured to rotate between a pull state and a push state.

8. The magnetic motor of claim 7, wherein the piston is attracted to the lower cylinder head in the pull state, and wherein the piston is repelled from the lower cylinder head in the push state.

9. The magnetic motor of claim 8, wherein the third timing controller is configured to vary a phase between a longitudinal oscillation of the piston and an angular oscillation of the lower cylinder head.

10. The magnetic motor of claim 9, wherein the first pattern comprises an equal number of north-ended magnets and south-ended magnets radially disposed about a circumference of a circle.

11. The magnetic motor of claim 10, wherein the north-ended magnets and the south-ended magnets are sequentially disposed about the circumference of the circle.

12. The magnetic motor of claim 11, wherein the north-ended magnets and the south-ended magnets are sequentially disposed about the circumference of the circle in a North-South-North-South pattern, a North-South-North-South-North-South pattern, or a North-South-North-South-North-South-North-South pattern.

13. The magnetic motor of claim 11, wherein the north-ended magnets and the south-ended magnets are sequentially disposed about a diameter of the circle.

14. The magnetic motor of claim 13, wherein the north-ended magnets and the south-ended magnets are sequentially disposed about a diameter of the circle in one ring, two rings, or three rings.

15. A magnetic motor comprises:
at least one timing controller;
a linkage configured operably coupled to the at least one timing controller;
at least one cylinder characterized by a longitudinal axis;
wherein the at least one cylinder comprises:
 a. a piston comprising a first plurality of magnets characterized by a first pattern, wherein the first plurality of magnets comprise poles oriented parallel to said longitudinal axis;
 b. an upper cylinder head with a second plurality of magnets characterized by the first pattern, wherein the second plurality of magnets comprise poles oriented parallel to said longitudinal axis; and
 c. a lower cylinder head with a third plurality of magnets characterized by the first pattern, wherein the third plurality of magnets comprise poles oriented parallel to said longitudinal axis;
wherein the piston is configured to oscillate linearly in the cylinder and not rotate;
wherein the upper cylinder head is configured to rotate in place via the linkage and not move linearly;
wherein an angular orientation of the upper cylinder head is characterized by a square tooth function, wherein the upper cylinder head rotates from a pull state to a push state at about top dead center and about bottom dead center of the piston oscillation with respect to the upper cylinder head in accordance with the square tooth function;
wherein the lower cylinder head is configured to rotate in place via the linkage and not move linearly;
wherein an angular orientation of the lower cylinder head is characterized by the square tooth function, wherein the upper cylinder head rotates from a pull state to a push state at top dead center or near top dead center of the piston oscillation with respect to the upper cylinder head in accordance with the square tooth function.

16. The magnetic motor of claim 15, wherein the first pattern comprises a plurality of north-ended magnets and a plurality of south-ended magnets sequentially disposed about a circle, wherein each of the plurality of north ended magnets is interposed between and adjacent to two south-ended magnets and each of the plurality of south-ended magnets is interposed between and adjacent to two north-ended magnets.

17. The magnetic motor of claim 16, wherein the upper cylinder head and lower cylinder head are configured to rotate a predetermined angle between the pull state and the push state, wherein the predetermined angle is less than or equal to 90 degrees, wherein an alignment of the first plurality of magnets characterized by the first pattern generate an attractive force with respect to the second plurality of magnets characterized by the second pattern in the pull state, and wherein an alignment of the first plurality of magnets characterized by the first pattern generate a repulsive force with respect to the second plurality of magnets characterized by the second pattern in the push state.

18. The magnetic motor of claim 17, wherein the upper cylinder head rotates the predetermined angle between a pull state and a push state at about top dead center and rotates the predetermined angle between a pull state and a push state at about bottom dead center, and wherein the lower cylinder head rotates the predetermined angle between a pull state and a push state at about top dead center and rotates the predetermined angle between a pull state and a push state at about bottom dead center;
 wherein the predetermined angle corresponds to an angular width of a north-ended magnet or a south-ended magnet, and the angular width of a north-ended magnet or a south-ended magnet is equal to or less than 90 degrees.

19. The magnetic motor of claim 18, wherein the linkage is configured to rotate the upper cylinder head and lower cylinder head, and wherein the linkage is coupled to an outer ring of the upper cylinder head and lower cylinder head.

* * * * *